R. B. DISBROW.
MILKING MACHINE.
APPLICATION FILED JAN. 19, 1916.
1,259,375.
Patented Mar. 12, 1918.
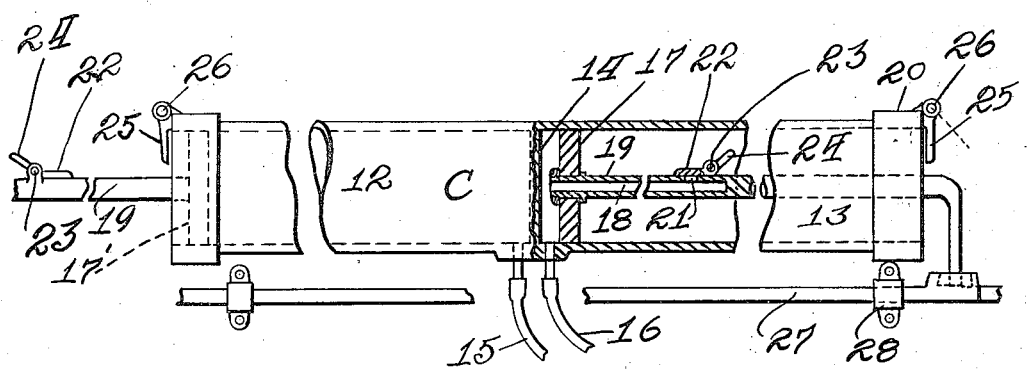
Fig. 1.
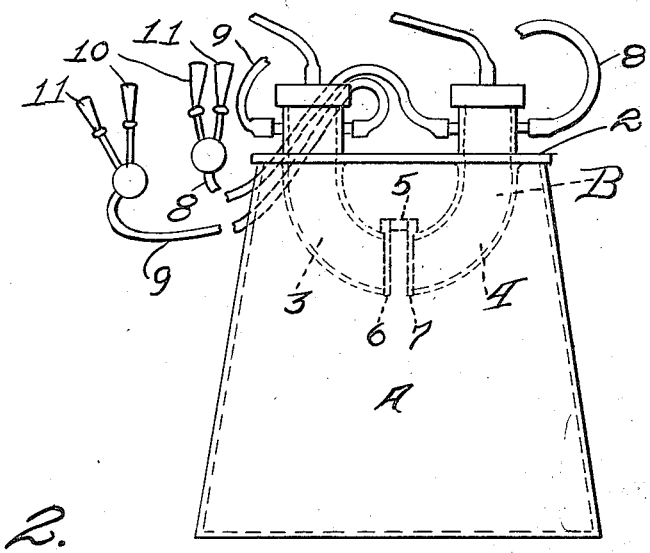
Fig. 2.
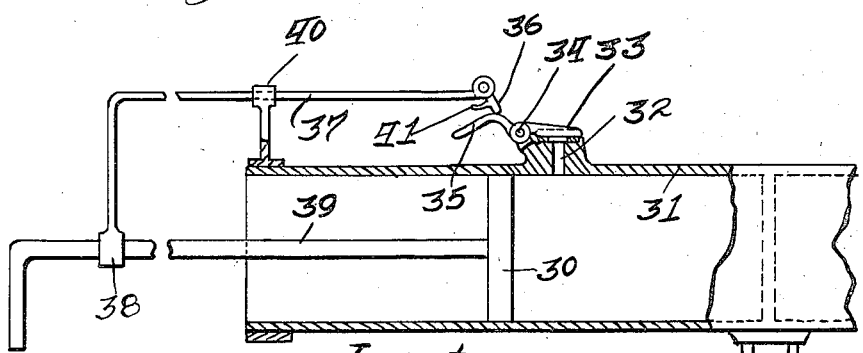
Inventor:
Reuben B. Disbrow
by: F. S. Bradbury
Attorney.

UNITED STATES PATENT OFFICE.

REUBEN B. DISBROW, OF ST. PAUL, MINNESOTA.

MILKING-MACHINE.

1,259,375.	Specification of Letters Patent.	Patented Mar. 12, 1918.

Application filed January 19, 1916. Serial No. 73,041.

*To all whom it may concern:*

Be it known that I, REUBEN B. DISBROW, a citizen of the United States, residing at St. Paul, in the county of Ramsey and State of Minnesota, have invented a new and useful Improvement in Milking-Machines, of which the following is a specification.

This invention relates to milking machines, in which a pulsating device is employed for alternately drawing milk from two sets of teats by the employment of teat cups. More particularly this invention is of that class in which a pump is employed in coöperation with a milk receiving chamber or mechanism for producing the above results. In the case above referred to, it is desirable to so construct the pump that the suction produced in the milk chamber near the end of each return stroke of the piston in the pump is relieved quickly, thereby instantly relieving the suction upon the teat by the teat cup as the piston approaches the end of its return stroke. Otherwise the pump will produce a continuous vacuum or suction in the teat cup. The primary object therefore of this invention is to automatically relieve the suction produced in the teat cups near the end of the return stroke of each piston in the pump, thereby producing a long steady compression upon the teats and a short but complete release, resembling hand milking.

In the accompanying drawing forming part of this specification, Figure 1 is a diagrammatic view of my invention, part of the structure being broken away and in section, and Fig. 2 is a side elevation of a detail of an alternative construction.

In the drawing A indicates a milk receiving receptacle upon which is mounted a mechanism B constructed in accordance with the invention set forth in my companion application Serial Number 52,192, filed Sept. 23, 1915, for improvements in milking apparatus. This chamber is in the form of a cover 2 which is placed over the body of the receptacle A, and has mounted thereon a pair of oppositely disposed tubular milk containers 3 and 4, which are similar in construction. The bodies of these milk containers extend upwardly through the cover and their lower ends are curved inwardly and terminate a short distance apart. Upon the lower ends of these containers is a resilient valve made of rubber or other suitable material having a yoke 5 and a pair of depending valve plates 6 and 7. These valve plates normally close the lower ends of the milk containers, and are adapted to open alternately and release the milk drawn into the containers 3 and 4 through the milking tubes 8 and 9 and teat cups 10 and 11 on said tubes in the usual manner. There are two sets of milking tubes 8 and 9 shown provided in connection with the milk chamber, one tube of one set being connected to one of the milk containers, and the other tube of said set connected with the opposite milk container. Thus the teat cups of each set of milking tubes are subjected to the action of suction produced in the milk containers alternately.

C indicates a pump having two cylinders 12 and 13 in co-axial alinement and formed by a single casing divided by a wall 14 at the inner adjacent ends of the cylinders. The inner adjacent ends of the cylinders of this pump are connected one by a tube 15 with the milk container 3 and the other by a tube 16 with the milk container 4, and these cylinders contain reciprocable pistons 17 and 17' which are adapted to reciprocate alternately, resulting in the alternate pulsations of suction produced in the milk containers 3 and 4, and causing the milking tubes such as 8 and 9 to alternately draw milk through their respective teat cups.

The inner end of each piston rod is passaged longitudinally at 18 and formed with a vent port 21. As the pistons and their coöperating parts are similar it will be understood that a description of one is applicable to either.

Placed upon the piston rod 19, is a flap valve 22 which is hinged at 23 on said rod, so as to swing and open or close the corresponding port 21. This valve has an arm 24 slanting outwardly toward the outer end of the cylinder and is adapted to sweep against an outwardly swinging operating member 25, which is hinged at 26 from the supporting collar 20 and hangs in the path of travel of said arm 24. The operating member 25 is held from inward swinging movement by striking against the end of the collar 20. Thus as the piston 17 moves outwardly, the valve 22 remains closed and near the middle of the return stroke of the piston the valve is opened automatically by the arm 24 striking the operating member 25 which tilts the valve 22 open and admits air into the cylinder through passage 18. As a result a long suction pulsation is produced by the teat cups during all of the outward and part of the return stroke of the piston and a quick release is effected near the middle of each return stroke, the apparatus thereby being adapted to simulate hand milking.

The ends of the piston rods 19 are offset and the offset portions engaged and supported by a shaft 27, which is slidably mounted in the bearings 28 or in any other suitable manner and reciprocated by any power means (not shown) desired. The connections with the shaft are arranged, so that while either piston is moved outwardly the other is moved inwardly.

In operation the pistons 17 and 17' are reciprocated simultaneously, the one moving outward while the other moves inwardly, thus producing vacuum tendencies or suction pulsations through the teat cups. Near the middle of each return stroke of each piston, the corresponding valve is opened automatically and the entire suction force instantly released from the corresponding cylinder and teat cups. As a result a long substantially steady compression is produced upon the teats followed by a short but complete release resembling hand milking.

Various modifications of structure can be employed for accomplishing the results stated, Fig. 2 illustrating one alternative form by which the vacuum is relieved near the middle of each return stroke of the piston 30 in its cylinder 31. A relief port 32 is provided through the wall of the cylinder, which is closed and opened by a valve 33. This valve is pivotally mounted at 34 on the cylinder and formed with an outwardly curved or shouldered extension 35 by which the valve is tilted into open or released into closed position over the port. Said valve remains closed automatically during the suction and part of each return stroke of the piston, but when the piston is approaching the middle of each return stroke the valve 33 is opened, thus instantly relieving suction upon any of the teat cups which are connected therewith. The mechanism for operating the valve in the manner stated consists of a tilting arm 36 hinged from the end of a thrust arm 37, said arm being offset and secured by a collar 38 to the outer end of the solid piston rod 39. Thus as the piston moves outwardly carrying with it the operating arm 37, the latter member sliding in the bearing 40 on the cylinder, the tilting arm 36 sweeps freely over the valve extension 35 without opening the valve 33 but near the end of the return stroke a shoulder 41 of the arm 36 strikes against the member 37 holding the arm 36 in downward position and when coming into contact against the extension 35 causing it to tilt the valve 33 open and relieve the vacuum tendency in the cylinder.

It will be readily understood that during the suction stroke and the early portion of the return stroke of each piston, the corresponding teat cup or cups affected thereby will draw the teat or teats into the cup or cups and at the same time draw the milk steadily into the connected tube or tubes from which it flows into the connected milk chamber or chambers, and that near the end of each return stroke of the piston, the teat cup or cups will not draw any milk therefrom and that the air forced by the return stroke after the relief valve has opened, forces the valve of the connected milk chamber open and ejects the milk from said chamber into the milk receptacle. Thus by releasing the suction force in the pump near the middle of each return stroke, the above action is made most effective.

In accordance with the patent statutes, I have described the principles of operation of my invention together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. In a milking machine, in combination, teat cups, mechanism comprising suction chambers with each of which a teat cup is connected, cylinders connected to said chambers, pistons reciprocated in said cylinders for exhausting air intermittently from said chambers so as to produce suction pulsations alternately in said teat cups, and means for releasing substantially all of the suction force of said cylinders near the middle of each return stroke of said pistons for the purposes specified.

2. In a milking machine, in combination, teat cups, mechanism comprising alternating suction chambers, a milk receptacle into which said mechanism is adapted to discharge milk, pipes leading from each of the chambers in said mechanism to said teat cups, a pump for alternately exhausting air from said chambers so as to produce suction pulsations alternately in said teat cups and means for releasing substantially all of the suction force in each of said chambers near the middle of each return stroke.

3. In a milking machine, in combination, teat cups, mechanism comprising alternating milk receiving suction chambers, a milk receptacle into which said mechanism is adapted to discharge milk, milking tubes leading from each of the chambers in said mechanism to said teat cups, a pump having a cylinder and piston in reciprocable connection for producing suction pulsations in said teat cups, the chamber in said cylinder being connected with a chamber in said mechanism and said piston having a passaged member forming a relief opening from the chamber in said cylinder, a valve closing said passage, and means for opening said valve as said piston approaches the middle of its return stroke.

4. In a milking machine, in combination, teat cups, mechanism comprising alternating milk receiving suction chambers, a milk receptacle into which said mechanism is adapted to discharge milk, milking tubes leading from each of the chambers in said mechanism to said teat cups, a pump having a cylinder and piston in reciprocable connection for producing suction pulsations in said teat cups, the chamber in said cylinder being connected with a chamber in said mechanism and said piston having a passaged rod forming an opening from the cylinder chamber to the outer atmosphere, a valve normally closing said passage, and a device movable with said piston for opening said valve as said piston approaches the middle of its return stroke, whereby a long suction action and a short release is produced by said piston.

In testimony whereof, I have signed my name to this specification.

REUBEN B. DISBROW.